(12) United States Patent
Jeong et al.

(10) Patent No.: US 11,286,842 B2
(45) Date of Patent: Mar. 29, 2022

(54) SPEED-SENSITIZED TYPE AIR DUCT APPARATUS (71) Applicants: Hyundai Motor Company, Seoul (KR); Kia Motors Corporation, Seoul (KR)

(72) Inventors: Seong Bin Jeong, Hwaseong-si (KR); Jai Hak Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 159 days.

(21) Appl. No.: 16/742,510

(22) Filed: Jan. 14, 2020

(65) Prior Publication Data

US 2021/0108554 A1    Apr. 15, 2021

(30) Foreign Application Priority Data

Oct. 14, 2019    (KR) .......................... 10-2019-0126953

(51) Int. Cl.
*F01P 11/10*      (2006.01)
*F01P 7/02*       (2006.01)

(52) U.S. Cl.
CPC ................. *F01P 11/10* (2013.01); *F01P 7/02* (2013.01); *F01P 2050/22* (2013.01)

(58) Field of Classification Search
CPC .......... F01P 11/10; F01P 7/02; F01P 2050/22
USPC ...................................... 123/41.04
See application file for complete search history.

(56) References Cited

U.S. PATENT DOCUMENTS

2013/0110356 A1*   5/2013   Konishi ............... B60K 11/085
                                                        701/49

FOREIGN PATENT DOCUMENTS

KR            20140030754 A      3/2014

* cited by examiner

*Primary Examiner* — Lindsay M Low
*Assistant Examiner* — Omar Morales
(74) *Attorney, Agent, or Firm* — Slater Matsil, LLP (57) ABSTRACT A speed-sensitized type air duct apparatus includes an air duct having an internal space, an inlet at a front through which cooling air can be introduced, and an outlet at a rear through which the cooling air can be discharged. A guide extends across the internal space of the air duct in a front-rear direction. The guide has a number of air curtains configured to guide flow of the cooling air and having turning portions to change a flow direction of the cooling air, at some sections to decrease a flow rate of cooling air that is discharged to the outlet with the flow direction of the cooling air further changed as a flow speed of cooling air entering the inlet increases.

20 Claims, 10 Drawing Sheets

SPEED-SENSITIZED TYPE AIR DUCT APPARATUS

CROSS-REFERENCE TO RELATED APPLICATIONS

This application claims the priority to Korean Patent Application No. 10-2019-0126953, filed Oct. 14, 2019, the disclosure of which is incorporated herein by reference.

TECHNICAL FIELD

The present disclosure relates to a speed-sensitized type air duct apparatus.

BACKGROUND

In general, since the temperature in the combustion chambers of the engine of a vehicle reaches up to high temperature over about 1500° C., if the combustion chambers are not appropriately cooled, the parts of the engine body are damaged, a lubricant decreases in viscosity and changes in quality, intake efficiency is decreased due to expansion of a gas mixture, and abnormal combustion occurs. Further, the operation of the engine is deteriorated, which causes overheating of the engine that causes operation incapability.

Accordingly, an engine is equipped with a cooling system for maintaining the temperature of combustion chambers, cylinders, valve devices, etc. at temperature that is the most suitable for the operation of the engine.

The cooling systems of vehicles change in cooling performance in accordance with the flow rate of air that depends on the driving speed of the vehicle, and there is a problem that the cooling air that is introduced into the engine room is insufficient under a low-speed driving condition and the cooling air that is introduced into the engine room is excessive under a high-speed driving condition.

That is, since excessive cooling air is introduced into the engine room under a high-speed driving condition, the amount of heat discharged from a radiator is larger than the amount of the total heat generated by an engine, which deteriorates the fuel efficiency.

On the other hand, when an intake port is enlarged to secure cooling air under a low-speed driving condition, more excessive cooling air is introduced in a high-speed driving condition.

As described, it is not considered in the related art to control the inflow amount of air according to the driving speed of a vehicle through a duct through which air is introduced.

The description provided above as a related art of the present disclosure is just for helping understanding the background of the present disclosure and should not be construed as being included in the related art known by those skilled in the art.

SUMMARY

Embodiments of the present disclosure relate to a speed-sensitized type air duct apparatus that secures a flow rate of cooling air under a low-speed driving condition of a vehicle and prevents an excessive flow rate of the cooling air under a high-speed driving condition. Embodiments of the present disclosure can solve problems of known devices.

For example, a speed-sensitized type air duct apparatus according to an embodiment the present disclosure includes an air duct having an internal space, an inlet at a front through which cooling air is introduced, and an outlet at a rear through which cooling air is discharged. A guide extends across the internal space of the air duct in a front-rear direction and has several air curtains that guide flow of cooling air and have turning portions that changes a flow direction of cooling air to decrease a flow rate of cooling air that is discharged to the outlet with the flow direction of the cooling air further changed as a flow speed of cooling air entering the inlet increases.

The guide includes several first air curtains having first turning portions at front ends to change the flow direction of cooling air, and several second air curtains having several second turning portions at rear ends to change the flow direction of cooling air that has flowed in the internal space.

The first air curtains are disposed in a central area of the air duct and the second air curtains are disposed at both sides of the first air curtains.

Protrusive lengths of the front ends of the first air curtains and the second air curtains gradually decrease from a center to both sides of the air duct.

A first air curtain disposed at a center of the first air curtains is longest and the other first air curtains arranged at both sides of the first air curtain disposed at the center may gradually shorten as they go away from the first air curtain disposed at the center.

Length differences of the first air curtains are set such that length differences of the air curtains gradually increase as they go away from the first air curtain disposed at the center.

The first turning portions are formed such that widths gradually increase forward at front ends of the first air curtains.

First turning portion of the first air curtain disposed at the center is formed such that a width gradually increases toward both sides as it goes to a front, and the first turning portions of the other first air curtains arranged at both sides of the first air curtains are formed such that widths gradually increase in an opposite direction to the first air curtain disposed at the center as they go to fronts.

A front end of the first turning portion is inclined rearward.

The first turning portion of the first air curtain disposed at the center is formed such that both sides are inclined rearward at a center, and the first turning portions of the other first air curtains are formed to be inclined rearward in the opposite direction to the first air curtain disposed at the center.

Inclination angles of the first turning portion of the first air curtain disposed at the center and the first turning portions formed at the other first air curtains are formed such that the inclinations of the first turning portions gradually increases as they go away from the first air curtain disposed at the center.

The second air curtains include several fixed guides extending in the front-rear direction and turning guides spaced apart from the fixed guides, extending in the front-rear direction, and each having second turning portions protruding toward the fixed guides at a rear end.

The turning guide has a straight end portion spaced apart from the fixed guides and extending in the front rear direction, and an extending end portion curved toward the outlet from the straight end portion. One or more second turning portions laterally protrude toward the fixed guides are formed at the extending end portion.

First paths for flow of cooling air are formed between the fixed guides and between the fixed guides and the air duct, second paths are formed between the straight end portion of the turning guide and the fixed guides, and the second turning portions protrude in the second paths, so flow of cooling air flowing through the second paths is turned to the first paths.

Widths of the first paths are smaller than widths of the second paths, so a flow rate of the cooling air in the second paths is larger than a flow rate of the cooling air in the first paths.

The second turning portions protrude to have a curved surface and a protrusive angle of the curved surface is an acute angle with respect to a flow direction of cooling air.

Rear ends of fixed guides disposed adjacent to the second turning portions of the several fixed guides are curved in the same direction as the curved surfaces of the second turning portions.

The inlet of the air duct is larger than the outlet and a cooling unit is disposed behind the outlet.

According to the speed-sensitized type air duct apparatus having the structure described above, several air curtains are disposed in an air duct, so when the speed of cooling air entering the air duct is low, the cooling air smoothly flows along the air curtains, so a flow rate of the cooling air is secured under a low-speed driving condition. When the speed of cooling air entering the air duct is high, the flow direction of the cooling air is changed by the air curtains and flow of the cooling air is interfered, so the flow rate of the cooling air is decreased in a high-speed driving condition.

Therefore, since cooling air is secured under a low-speed driving condition of a vehicle, so cooling performance is secured. Further, excessive inflow of cooling air is prevented under a high-speed driving condition of a vehicle, so a decrease in fuel consumption due to overcooling is prevented.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

A speed-sensitized type air duct apparatus according to exemplary embodiments of the present disclosure is described hereafter with reference to the accompanying drawings.

Figure 1:
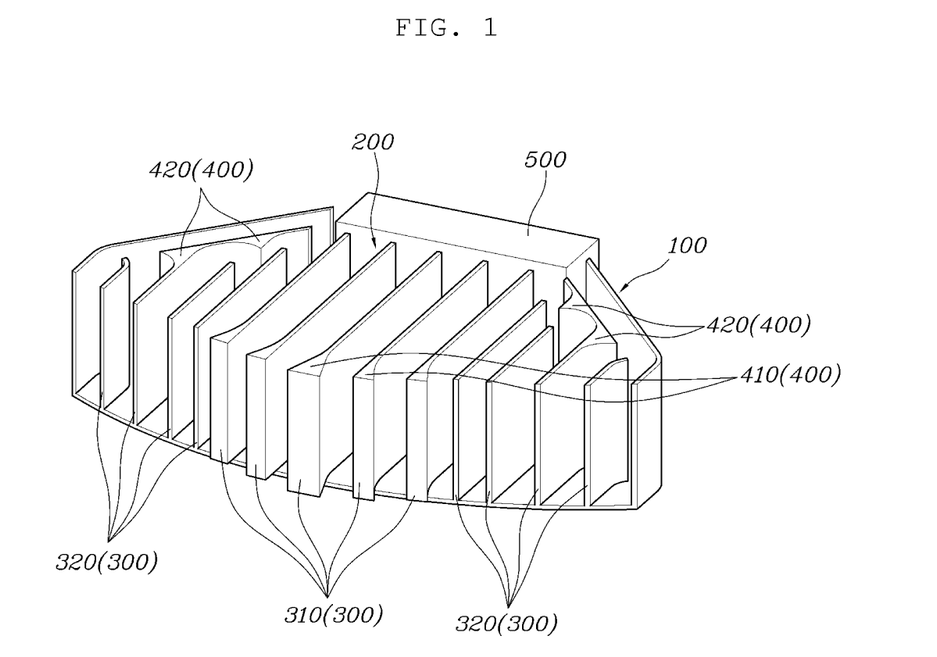
FIG. 1 is a view showing a speed-sensitized type air duct apparatus according to an embodiment of the present disclosure.
Figure 2:
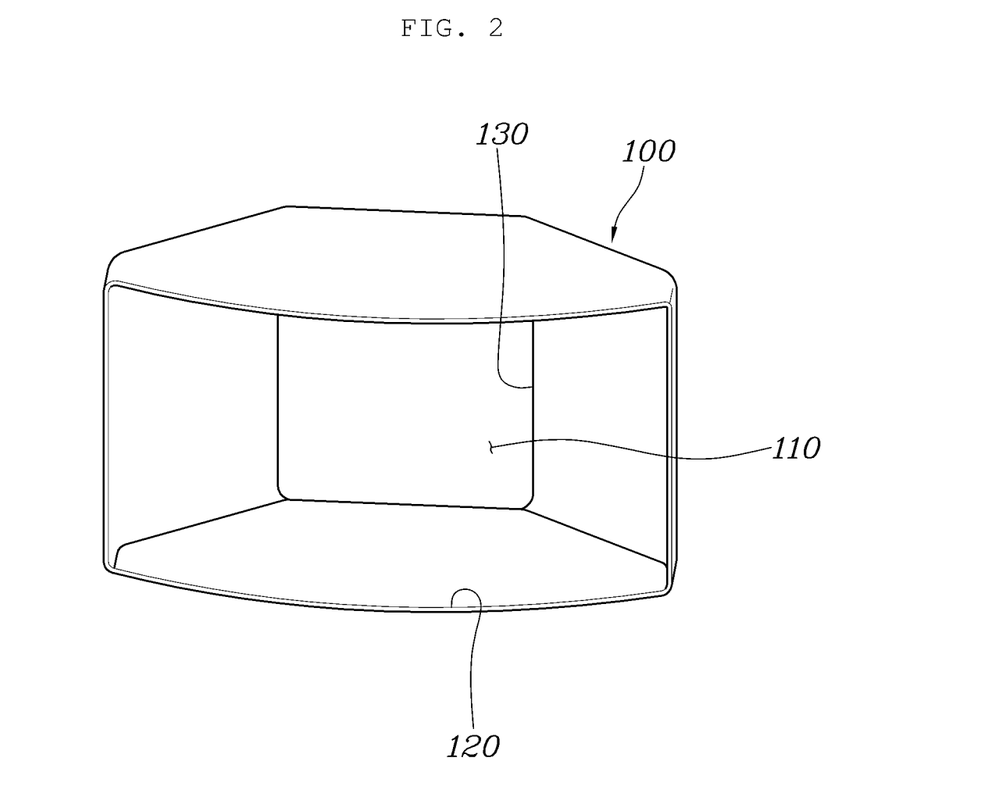
FIG. 2 is a view showing an air duct of the speed-sensitized type air duct apparatus shown in FIG. 1.
Figure 3:
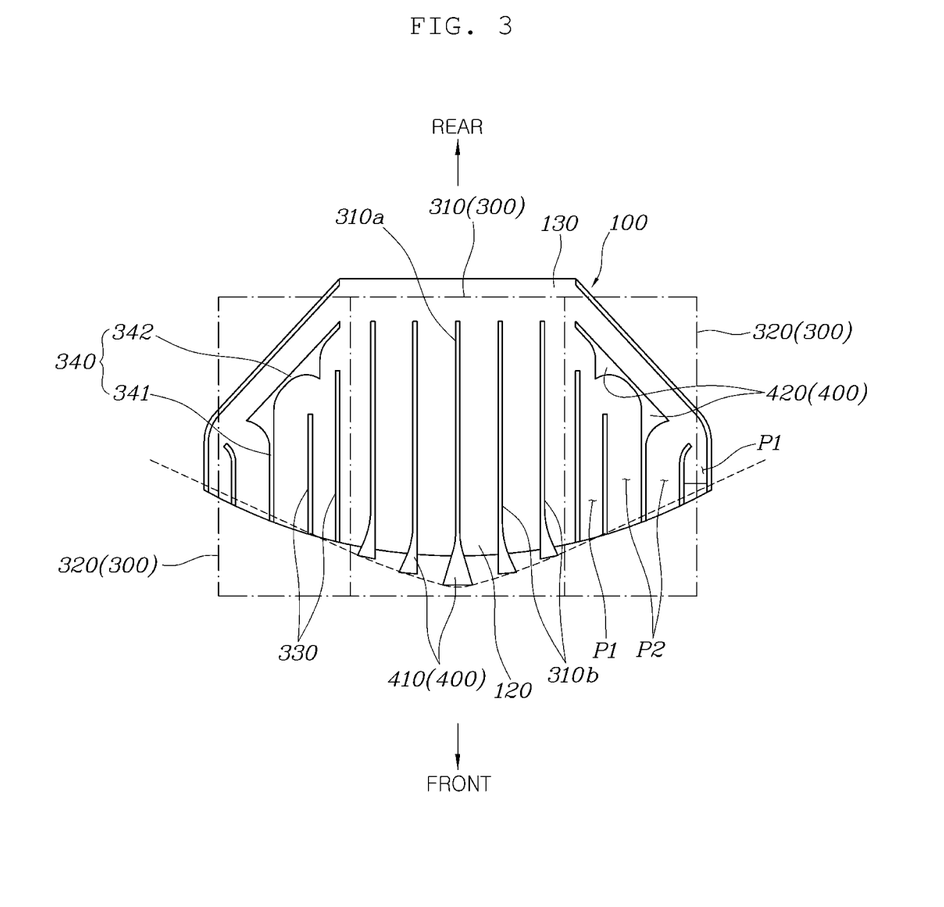
FIG. 3 is a cross-sectional view of the speed-sensitized type air duct apparatus shown in FIG. 1.
Figure 8:
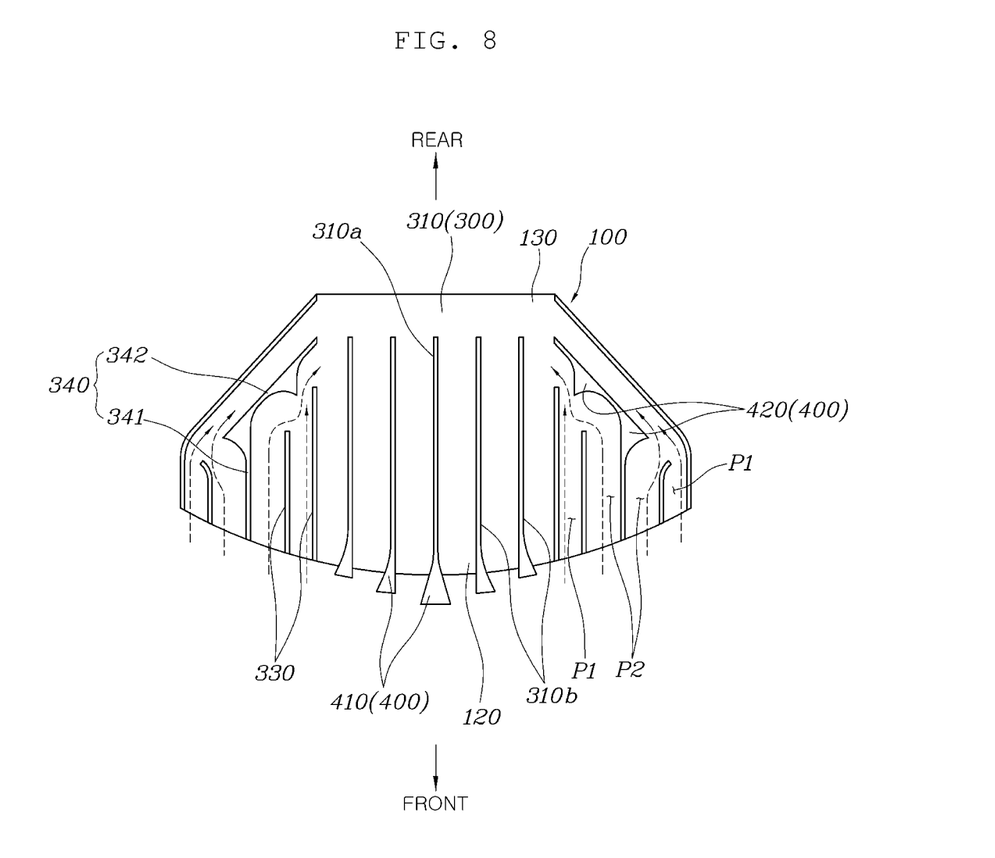
Figure 9:
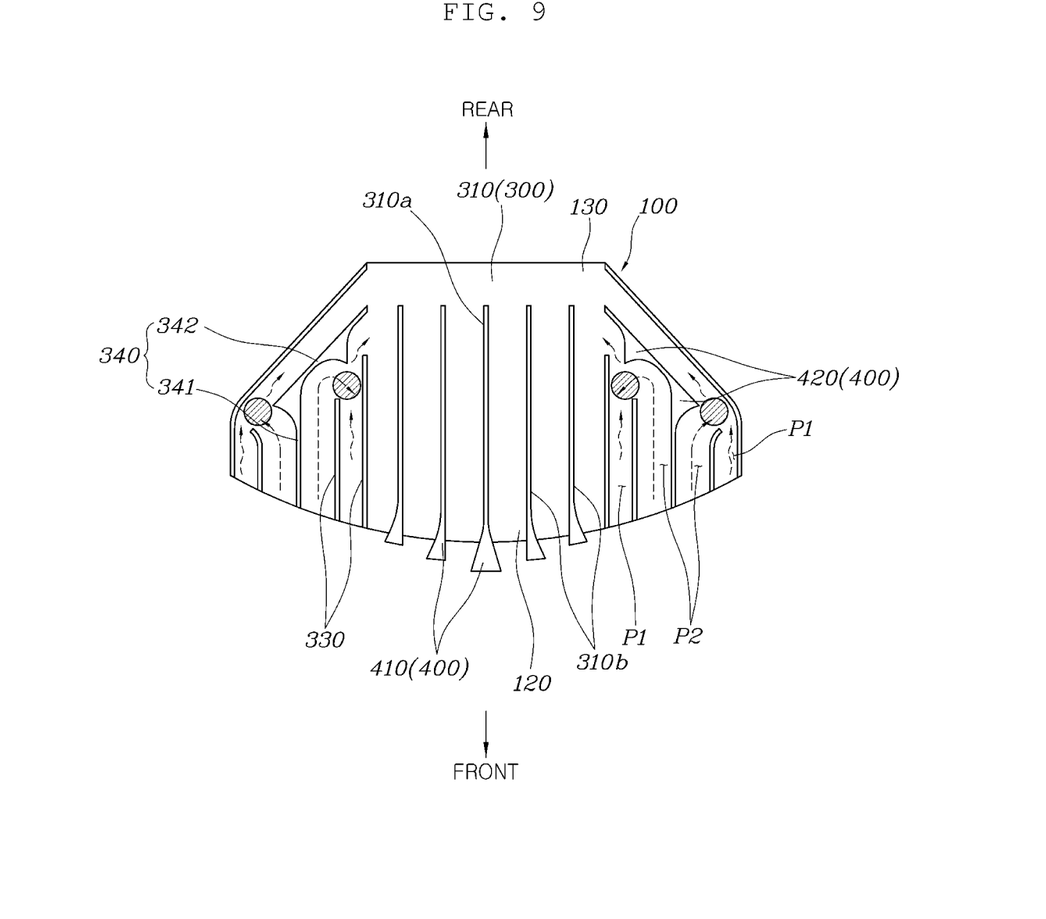
Figure 10:
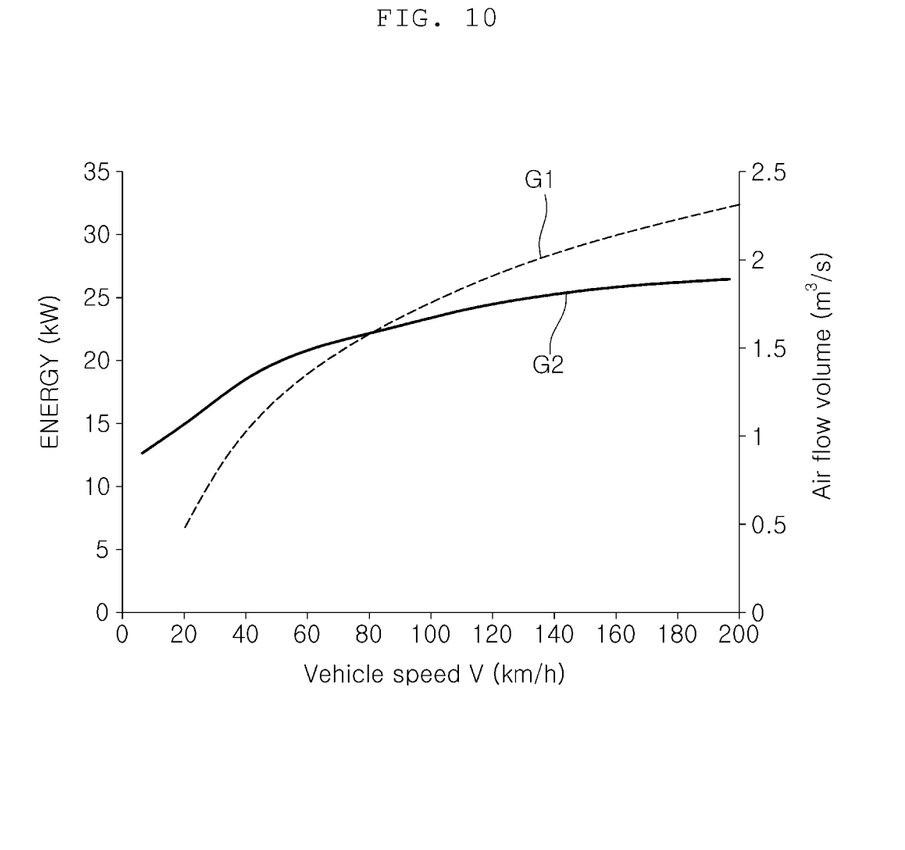
FIG. 10 is a graph showing the effect of the speed-sensitized type air duct apparatus according to the present disclosure.

FIG. 1 is a view showing a speed-sensitized type air duct apparatus according to an embodiment of the present disclosure, FIG. 2 is a view showing an air duct of the speed-sensitized type air duct apparatus shown in FIG. 1, FIG. 3 is a cross-sectional view of the speed-sensitized type air duct apparatus shown in FIG. 1, FIGS. 4 to 6 are views showing a first air curtain of the speed-sensitized type air duct apparatus shown in FIG. 1, FIGS. 7 to 9 are views showing a second air curtain of the speed-sensitized type air duct apparatus shown in FIG. 1, and FIG. 10 is a graph showing the effect of the speed-sensitized type air duct apparatus according to the present disclosure.

A speed-sensitized type air duct apparatus according to the present disclosure, as shown in FIGS. 1 to 3, includes: an air duct 100 having an internal space 110, an inlet 120 at the front through which cooling air is introduced, and an outlet 130 at the rear through which cooling air is discharged; and a guide 200 extending across the internal space 110 of the air duct 100 in a front-rear direction, and having several air curtains 300 that guide flow of cooling air and have turning portions 400 that changes the flow direction of cooling air to decrease the flow rate of cooling air that is discharged to the outlet 130 with the flow direction of the cooling air further changed as the flow speed of cooling air entering the inlet 120 increases.

As described above, the guide 200 is disposed in the internal space 110 of the air duct 100. The air duct 100 has the inlet 120 and the outlet 130 and the internal space 110 between the inlet 120 and the outlet 130, so cooling air flowing inside through the inlet 120 is discharged to the outlet 130 through the internal space 110. A cooling unit 500 may be disposed behind the air duct 100 and the inlet 120 is larger than the outlet 130, so the inflow amount of cooling air can be secured and the cooling air can flow to the cooling unit 500. Since the inlet 120 is larger than the outlet 130, the air duct has a shaped of which the area gradually decreases, so an increase in flow speed of cooing air is induced, thereby improving cooling efficiency.

The guide 200 has several air curtains 300 disposed across the internal space 110 in the front-rear direction. In particular, the turning portions 400 that changes the flow direction of cooling air are formed in some sections of the air curtains 300 so that the flow rate of cooling air that is sent to the cooling unit 500 is controlled in accordance with the flow speed of the cooling air that depends on the driving speed of a vehicle.

That is, when the flow speed of cooling air entering the inlet 120 is low, the turning portions 400 of the air curtains 300 do not greatly influence the flow of the cooling air, so the cooling air smoothly flows along the air curtains 300, whereby the flow rate of the cooling air flowing to the cooling unit 500 is secured. On the contrary, when the flow speed of cooling air entering the inlet 120 is high, the flow of the cooling air is interfered with by the turning portions 400 of the air curtains 300, so the flow rate of the cooling air flowing to the cooling unit 500 decreases.

Therefore, the flow rate of cooling air is secured under a low-speed condition of a vehicle, so cooling performance is improved; and the flow rate of cooling air is not excessive under a high-speed condition of a vehicle, so overcooling is prevented.

The present disclosure is described in detail. As shown in FIG. 3, the guide 200 may be composed of several first air curtains 310 having first turning portions 410 at the front ends to change the flow direction of cooling air entering the inlet 120, and several second air curtains 320 having several second turning portions 420 at the rear ends to change the flow direction of cooling air that has flowed in the internal space 110.

The guide 200, as described above, is composed of the first air curtains 310 and the second air curtains 320. Since the first air curtains 310 have the first turning portions 410 at the front ends, they change the flow direction of cooling air entering the inlet 120. Further, since the second air curtains 320 have the second turning portions 420 at the rear ends, they change the flow direction of cooling air that has flowed in the internal space 110.

That is, the flow direction of cooling air is changed at the inlet 120 or in the internal space 110 of the air duct 100 by the first air curtains 310 and the second air curtains 320, whereby the flow rate of the cooling air is controlled in accordance with the flow speed of the cooling air.

The first air curtains 310 may be disposed in the central area of the air duct 100 and the second air curtains 320 may be disposed at both sides of the first air curtains 310.

Relatively more cooling air concentrates in the central area than the side areas in the air duct 100. Accordingly, the first air curtains 310 that change the flow direction of cooling air at the inlet 120 of the air duct 100 are disposed in the central area in the air duct 100 and the second air curtains 320 that change the flow direction of cooling air in the internal space 110 of the air duct 100 are disposed at the side areas, whereby the flow rate according to the flow of cooling air can be efficiently controlled.

Further, the protrusive lengths of the front ends of the first air curtains 310 and the second air curtains 320 gradually decrease from the center to both sides of the air duct 100, so the flow direction of cooling air flowing inside from the front is changed well by the first air curtains 310 and the second air curtains 320. That is, since the first air curtains 310 change the flow direction of cooling air at the inlet 120 of the air duct 100, the cooling air flows to the second air curtains 320. Further, since the second air curtains 320 change the flow direction of the cooling air in the internal space 110 of the air duct 100, the flow rate of the cooling air is controlled by the pressure that is generated by the cooling air flowing therein.

Figure 4:
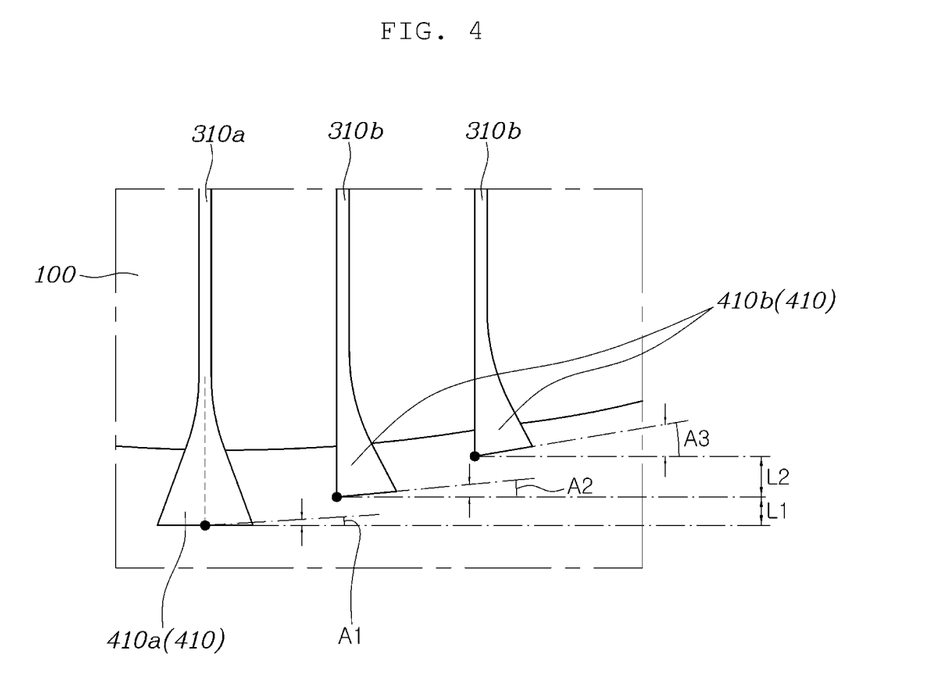
FIGS. 4 to 6 are views showing a first air curtain of the speed-sensitized type air duct apparatus shown in FIG. 1.

On the other hand, as shown in FIGS. 3 and 4, the first air curtain 310*a* disposed at the center of the first air curtains 310 may be longest and the other first air curtains 310*b* arranged at both sides of the first air curtain 310*a* disposed at the center may gradually shorten as they go away from the first air curtain 310*a* disposed at the center.

That is, since the first air curtain 310*a* disposed at the center is longest, the front end thereof protrudes farthest forward. Further, since the other first air curtains 310*b* shorten as they go away from the first air curtain 310*a* disposed at the center, the front ends of the other air curtains 310*b* sequentially protrude forward.

Therefore, the first air curtains 310 are arranged in a shape extending at an angle from the center to the rear, so cooling air entering the central area of the air duct 100 can have flow that divides to both sides by the first turning portions 410 formed at the first air curtains 310.

Further, as can be seen from FIG. 4, the length differences of the first air curtains 310 may be set such that the length differences of the air curtains 310 gradually increase as they go away from the first air curtain 310*a* disposed at the center. Accordingly, than the gap L1 between the front end of the first air curtain 310*a* disposed at the center and the front end of the next adjacent first air curtain 310*b*, the gap L2 between the front end of the next first air curtain 310*b* and the front end of the first air curtain 310*b* after the next first air curtain 310*b* is larger, so the length differences can gradually increase.

Accordingly, the cooling air entering the central area in the air duct 100 is divided to both sides by the first turning portions 410 formed at the first air curtains 310 and the flow rate of the cooling air can be controlled in accordance with the flow speed of the cooling air to the areas where the first air curtains 310 are formed due to the gradually increasing length differences of the first air curtains 310. Further, since the length differences are generated by the lengths of the first air curtains 310 that gradually decrease from the center to both sides, air resistance due to contact of cooling air with the first air curtains 310 decreases when a vehicle is driven.

As can be seen from FIG. 4, the first turning portions 410 may be formed such that the width gradually increases forward from the front ends of the first air curtains 310. Accordingly, cooling air entering the front of a vehicle changes the flow direction to sides by coming in contact with the first turning portions 410.

The first turning portions 410 are described in detail. The first turning portion 410*a* of the first air curtain 310 disposed at the center may be formed such that the width gradually increases toward both sides as it goes to the front, and the first turning portions 410*b* of the other first air curtains 310*b* arranged at both sides of the first air curtains 310*a* disposed at the center may be formed such that the widths gradually increase in the opposite direction to the first air curtain 310*a* disposed at the center as they go to the front.

That is, since the width of the first air curtain 310*a* disposed at the center gradually increases toward both sides, cooling air flowing to the first air curtain 310*a* disposed at the center has flow that divides to both sides. On the other hand, since the first turning portions 410*b* of the other first air curtains 310*b* arranged at both sides of the first air curtains 310*a* disposed at the center may be formed such that the widths gradually increase in the opposite direction to the first air curtain 310*a* disposed at the center as they go to the front, cooling air flowing to the other first air curtains 310*b* have flow that is guided in the opposite direction to the first air curtain 310*a* disposed at the center and goes to sides.

Accordingly, cooling air flowing to the first air curtains 310 of the air duct 100 has flow that is divided to sides by the first turning portions 410 of the first air curtains 310.

Further, since the front ends of the first turning portions 410 are inclined rearward, cooling air flowing to the first air curtains 310 can be guided along the inclined portions of the first turning portions 410.

The first turning portion 410*a* of the first air curtain 310 disposed at the center may be formed such that both sides are inclined rearward at the center and the first turning portions 410*b* of the other first air curtains 310*b* may be formed to be inclined rearward in the opposite direction to the first air curtain 310*a* disposed at the center. Therefore, cooling air flowing to the first air curtains 310 has flow that is divided to both sides along the inclined surfaces of the first turning portions 410 of the first air curtains 310. That is, the first turning portion 410*a* of the first air curtain 310*a* disposed at the center divides cooling air to both sides and the other air curtains 310*b* guides flow of cooling air in the opposite direction to the first air curtain 310*a* disposed at the center, whereby it is possible to form flow, which is divided to sides, of the cooling air flowing to the first turning portions 410.

The inclination angles of the first turning portion 410*a* of the first air curtain 310*a* disposed at the center and the first turning portions 410*b* formed at the other first air curtains 310*b* are formed such that the inclinations of the first turning portions 410 gradually increase as they go away from the first air curtain 310*a* disposed at the center.

That is, the inclination angle A2 of the first turning portion 410*b* formed at the next first air curtain 310*b* is larger than the inclination angle A1 of the first turning portion 410*a* formed at the first air curtain 310*a* disposed at the center, and the inclination angle A3 of the first turning portion 410*b* formed at the first air curtain 310b after the next first air curtain 310b is larger than the previous inclination angle A2, so the inclination angles of the first turning portions 410 gradually increase.

Accordingly, cooling air entering the central area in the air duct 100 is divided to both sides by the first turning portions 410 formed at the first air curtains 310. Further, since the inclination angles of the first turning portions 410 formed at the first air curtains 310 gradually increase, cooling air can smoothly flow to the first air curtains 310 when the flow speed of the cooling air is low, and cooling air flowing into the area where the first air curtains 310 are formed can be decreased when the flow speed of the cooling air is high.

Further, since the inclination angles of the first turning portions 410 of the first air curtains 310 gradually increase as they go to both sides, air resistance due to contact of cooling air with the first air curtains 310 decreases when a vehicle is driven.

The flow direction of cooling air that is generated by the first air curtains 310 is as follows.

Figure 5:
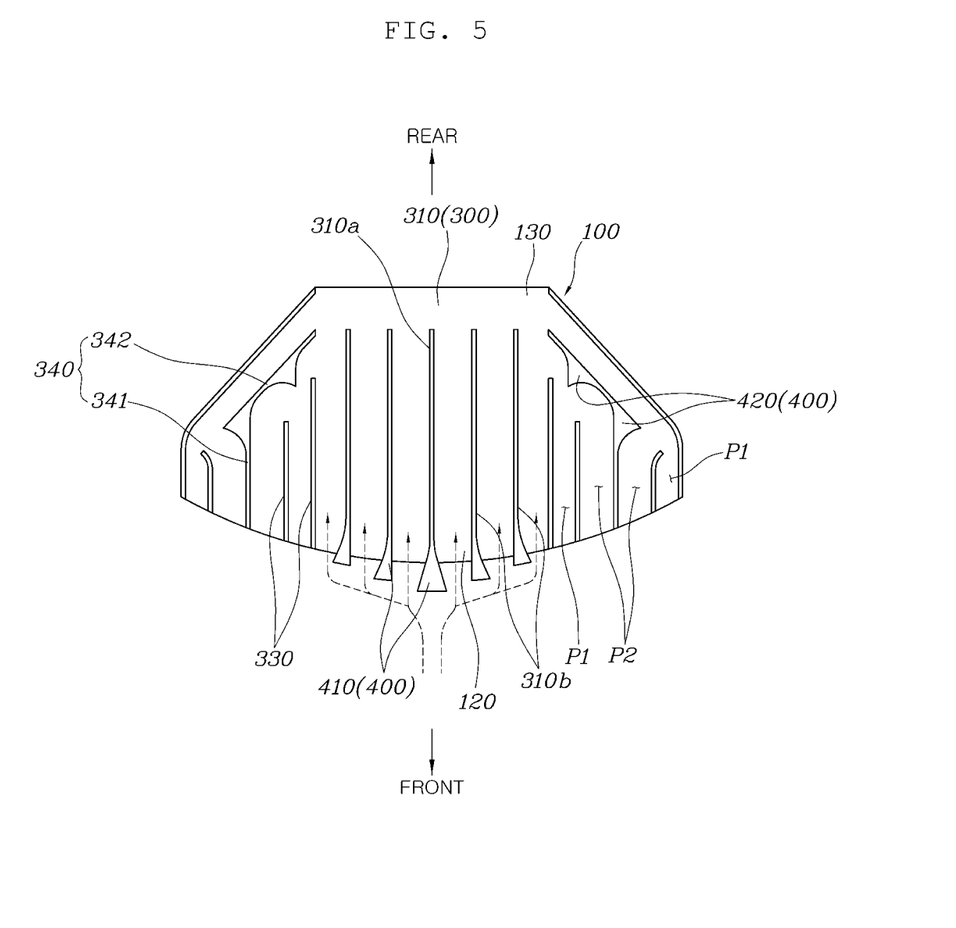

As shown in FIG. 5, when a vehicle is under a low-speed driving condition and the flow speed of cooling air is correspondingly low, the first turning portions 410 formed at the front ends of the first air curtains 310 do not greatly influence the flow of the cooling air, so the cooling air flows into the air duct 100 through the first turning portions 410. Further, cooling air flowing at a low flow speed can smoothly flow into the air duct 100 while flowing on the first turning portions 410 by the length differences of the first air curtains 310 and the inclination angles of the first turning portions 410. Accordingly, cooling performance is secured under a low-speed driving condition of a vehicle.

Figure 6:
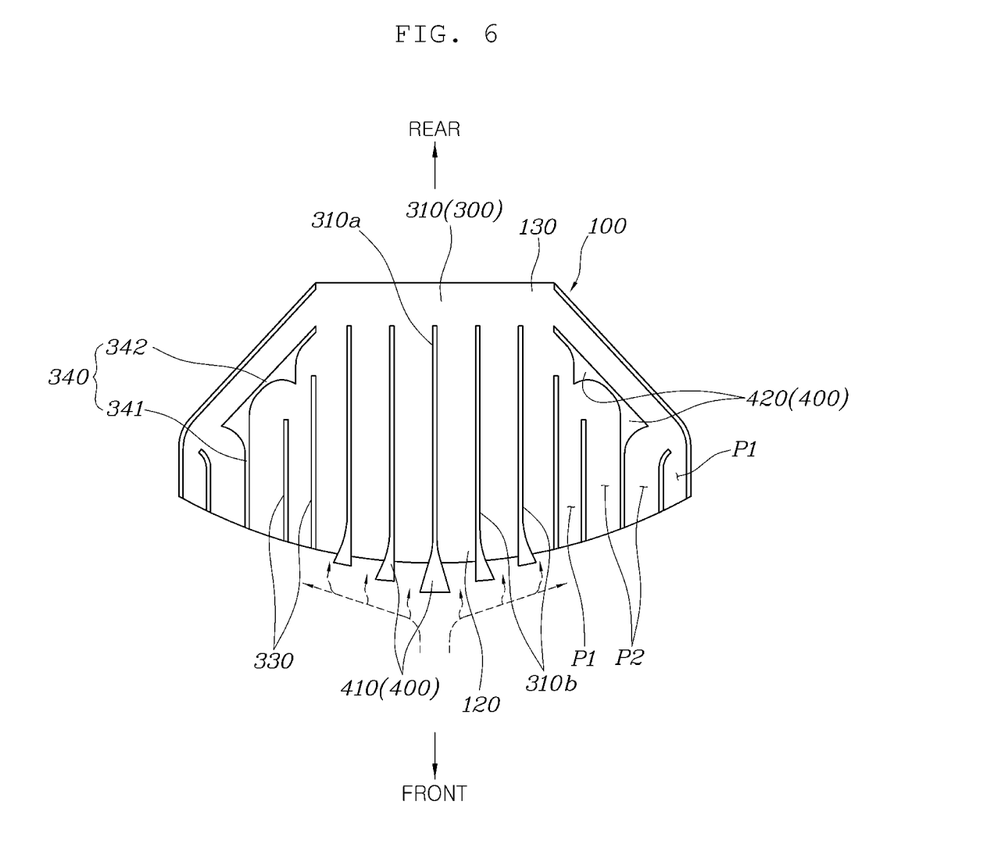

On the other hand, as shown in FIG. 6, when a vehicle is under a high-speed driving condition and the flow speed of cooling air is high, the flow of the cooling air is changed with a large angle by the first turning portions 410 formed at the front ends of the first air curtains 310. That is, due to the length differences of the first air curtains 310 and the inclination angles of the first turning portions 410, the flow direction of cooling air flowing at a high flow speed is changed by the first turning portions 410, so the cooling air divides to sides without entering the air duct 100. Therefore, cooling air is prevented from excessively flowing inside under a high-speed driving condition of a vehicle, so a decrease in fuel consumption due to overcooling is prevented.

Figure 7:
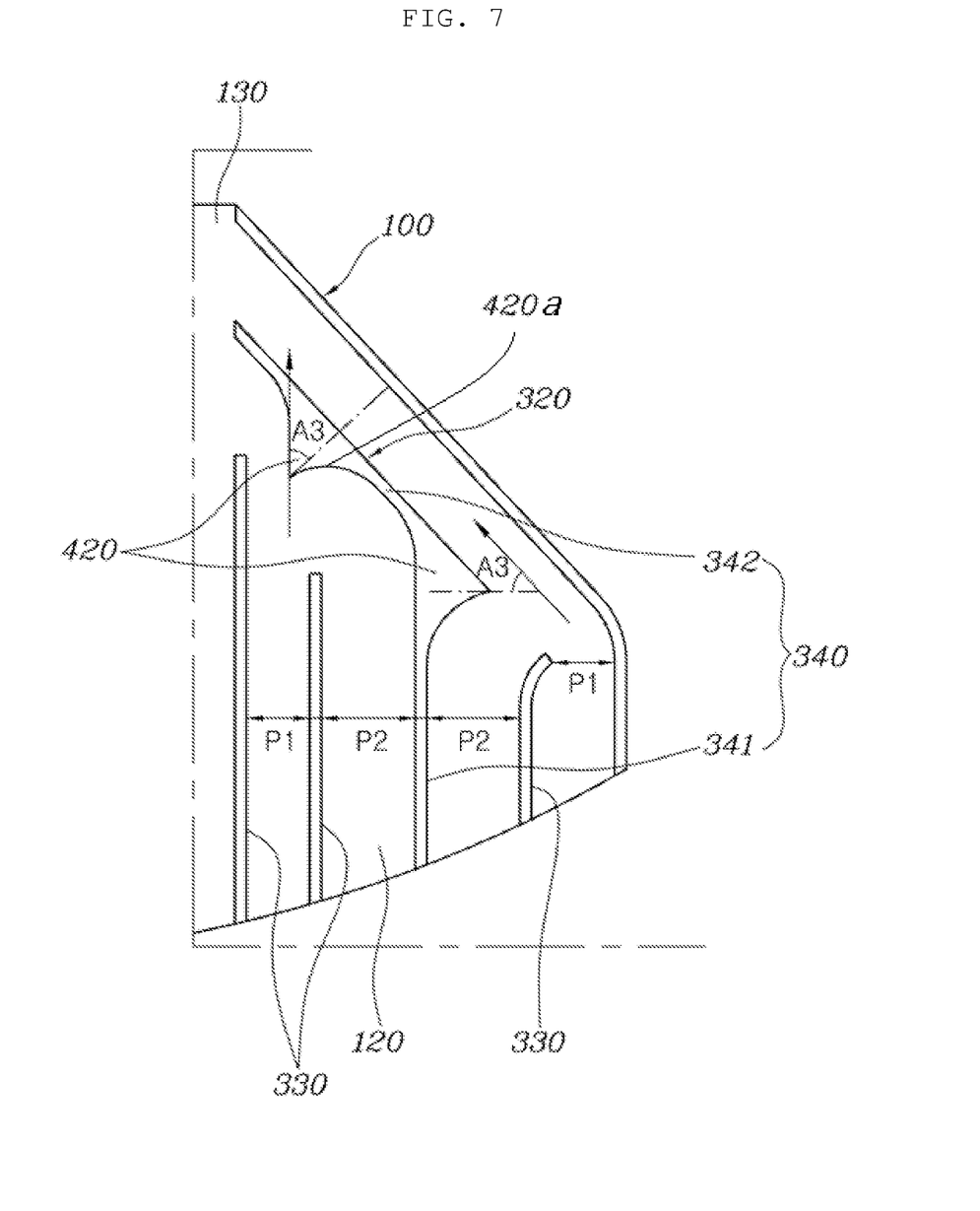
FIGS. 7 to 9 are views showing a second air curtain of the speed-sensitized type air duct apparatus shown in FIG. 1.

On the other hand, as shown in FIGS. 3 and 7, the second air curtains 320 may include several fixed guides 330 extending in the front-rear direction; and turning guides 340 spaced apart from the fixed guides 330, extending in the front-rear direction, and each having second turning portions 420 protruding toward the fixed guides 330 at the rear end.

The second air curtains 320 are composed of the fixed guides 330 and the turning guides 340 and the second turning portions 420 are formed at the rear ends of the turning guides 340, so the flow direction of cooling air flowing to the second air curtains 320 is changed by the second turning portions 420, whereby the flow rate of the cooling air can be controlled. In this configuration, the fixed guide 330 and the turning guides 340 may be spaced apart from each other, and the positions of the fixed guide may depend on the positions where the turning guides 340 and the second turning portions 420 are formed.

In detail, as shown in FIG. 7, the turning guide 340 has a straight end portion 341 spaced apart from the fixed guides 330 and extending in the front rear direction, and an extending end portion 342 curved toward the outlet 130 from the straight end portion 341. One or more second turning portions 420 laterally protruding toward the fixed guides 330 may be formed at the extending end portion 342.

The straight end portion 341 extends in the front-rear direction together with the fixed guides 330 and guides the flow of cooling air in cooperation with the fixed guides 330, and the extending end portions 342 extending and curved from the straight end portion 341 change the flow direction of cooling air. The extending end portion 342 may be formed to correspond to the shape of the air duct 100 having the large inlet 120 and the small outlet 130 and the second turning portions 420 protruding toward the fixed guides 330 are formed at the extending end portion 342, so the flow direction of cooling air flowing on the straight end portion 341 is changed by the second turning portions 420. This is for controlling the flow rate of the cooling air in accordance with the flow speed of the cooling air. When the flow speed of the cooling air is low, the flow direction is changed by the second turning portions 420 but the influence is not large, so the cooling air smoothly flows to the outlet 130. When the speed of cooling air is high, the flow direction is changed by the second turning portions 420, so the cooling air hits against cooling air traveling along another path, so pressure is increased, thereby interfering with the flow of the cooling air.

In detail, first paths P1 for flow of cooling air are formed between the fixed guides 330 and between the fixed guides 330 and the air duct 100, second paths P2 are formed between the straight end portion 341 of the turning guide 340 and the fixed guides 330, and the second turning portions 420 protrude in the second paths P2, so the flow of the cooling air flowing through the second paths P2 can be turned to the first paths P1.

As can be seen from FIG. 7, the second air curtain 320 forms the first paths P1 and the second paths P2 using the fixed guides 330 and the turning guides 340. Although cooling air flows through both of the first paths P1 and the second paths P2, the second turning portions 420 are formed in the second paths p2, so the flow of the cooling air flowing through the second paths P2 is turned to the first paths P1. That is, the cooling air flowing through the second paths P2 is turned to the first channels p1 by the second turning portions 420 and interfered with the cooling air flowing through the first paths p1, so the flow rate of the cooling air can be controlled in accordance with the flow speed of the cooling air.

The widths of the first paths P1 may be smaller than the widths of the second paths P2 so that the flow rate of the cooling air in the second paths P2 is larger than the flow rate of the cooling air in the first paths P1. Accordingly, when the flow speed of cooling air is high, the cooling air flowing in the second paths P2 is turned to the first paths P1 by the second turning portions 420, so high pressure is generated in the first paths P1, whereby the flow rate of the cooling air decreases. On the contrary, when the flow speed of cooling air is low, the influence on the cooling air flowing in the second paths P2 by the second turning portions 420 decreases, so the cooling air can flow to the outlet 130 together with the cooling air flowing in the first paths P1.

Further, as can be seen from FIG. 7, the second turning portions 420 protrude to have a curved surface 420a and the protrusive angle A3 of the curved surface 420a is an acute angle with respect to the flow direction of cooling air. Accordingly, the cooling air flowing through the second paths P2 can be smoothly changed in flow direction while flowing on the curved surfaces 420a of the second turning portions 420. In particular, since the protrusive angles of the curved surfaces 420a of the second turning portions 420 are acute angles with respect to the flow direction of cooling air, the cooling air passing through the second paths P2 can be induced to hit against the cooling air passing through the first paths P1 when the flow direction of the cooling air is changed by the second turning portions 420. Accordingly, when the flow speed of cooling air is high, high pressure is generated in the first paths P1, so flow of the cooling air can be stopped. Further, when the flow speed of cooling air is low, interference with the flow of the cooling air decreases, so the cooling air can smoothly pass through the internal space 110 of the air duct 100.

Meanwhile, the rear ends of the fixed guides 330 disposed adjacent to the second turning portions 420 of the several fixed guides 330 are curved in the same direction as the curved surfaces 420a of the second turning portions 420, so cooling air can smoothly flow to the second turning portions 420 and the curved portions at the rear ends of the fixed guides 330. Further, the rear ends of the fixed guides 330 disposed adjacent to the second turning portions 420 of the several fixed guides 330 may be spaced forward apart from the second turning portions 420.

The flow direction of cooling air that is generated by the second air curtains 320 is as follows.

As shown in FIG. 8, when a vehicle is under a low-speed driving condition and accordingly the flow speed of cooling air is low, the cooling air flowing in the internal space 110 of the air duct 100 flows along the fixed guides 330 and the turning guides 340. When the flow speed of cooling air is low, the cooling air is not greatly influenced by the second turning portions 420 formed at the turning guides 340, so the cooling air flows to the outlet 130 through the second turning portions 420. Accordingly, cooling performance is secured under a low-speed driving condition of a vehicle.

On the other hand, as shown in FIG. 9, when a vehicle is under a high-speed driving condition and the flow speed of cooling air is high, the flow of the cooling air is changed with a large angle by the second turning portions 420 formed at the turning guides 340 of the second air curtains 320. That is, the flow direction of the cooling air flowing through the second paths P2 is changed to the first paths P1 by the second turning portions 420, so the cooling air is interfered with by the cooling air flowing through the first paths P1. Further, high pressure is generated at the corresponding positions, so the flow rate of the cooling air is decreased. Therefore, cooling air is prevented from excessively flowing inside under a high-speed driving condition of a vehicle, so a decrease in fuel consumption due to overcooling is prevented.

The effect of the speed-sensitized type air duct 100 apparatus according to the present disclosure can be described with reference to the graph shown in FIG. 10.

As shown in FIG. 10, it can be seen from a graph G1 of the related art that energy according to inflow of cooling air remarkably decreases under a low-speed driving condition and inflow of cooling air excessively increases under a high-speed driving condition.

However, it can be seen from a graph G2 of the present disclosure that the inflow amount of cooling air is secured under a low-speed driving condition and inflow of cooling air decreases under a high-speed driving condition.

As described above, when the speed of cooling air entering the air duct 100 is low, the cooling air smoothly flows along the air curtains, so the flow rate of the cooling air is secured under a low-speed driving condition. When the speed of cooling air entering the air duct 100 is high, the flow direction of the cooling air is changed by the air curtains, so the flow rate of the cooling air decreases under a high-speed driving condition.

Therefore, since cooling air is secured under a low-speed driving condition of a vehicle, cooling performance is secured. Further, excessive inflow of cooling air is prevented under a high-speed driving condition of a vehicle, so a decrease in fuel consumption due to overcooling is prevented.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A speed-sensitized type air duct apparatus comprising:
an air duct having an internal space, an inlet at a front through which cooling air can be introduced, and an outlet at a rear through which the cooling air can be discharged; and
a guide extending across the internal space of the air duct in a front-rear direction, the guide having a plurality of first air curtains and a plurality of second air curtains configured to guide a flow of the cooling air and having turning portions to change a flow direction of the cooling air at some sections to decrease a flow rate of the cooling air that is discharged to the outlet with the flow direction of the cooling air further changed as a flow speed of the cooling air entering the inlet increases, the plurality of first air curtains having first turning portions at front ends to change the flow direction of the cooling air entering the inlet, and the plurality of second air curtains having second turning portions at rear ends to change the flow direction of the cooling air that has flowed in the internal space.

2. The speed-sensitized type air duct apparatus of claim 1, wherein the first air curtains are disposed in a central area of the air duct and the second air curtains are disposed at opposite sides of the first air curtains.

3. The speed-sensitized type air duct apparatus of claim 2, wherein protrusive lengths of the front ends of the first air curtains and the second air curtains gradually decrease from a center to both sides of the air duct.

4. The speed-sensitized type air duct apparatus of claim 1, wherein a central first air curtain that is disposed at a center of the first air curtains is longer than all other first air curtains, the other first air curtains being arranged at sides of the central first air curtain.

5. The speed-sensitized type air duct apparatus of claim 4, wherein the other first air curtains shorten as they go away from the central first air curtain.

6. The speed-sensitized type air duct apparatus of claim 5, wherein length differences of the first air curtains are set such that length differences of the first air curtains gradually increase as they go away from the central first air curtain.

7. The speed-sensitized type air duct apparatus of claim 1, wherein the first turning portions are formed such that widths increase forward at the front ends of the first air curtains.

8. The speed-sensitized type air duct apparatus of claim 7, wherein the first turning portion of a central first air curtain is formed such that a width gradually increases toward both sides as it goes to a front, the central first air curtain being disposed at a center of the first air curtains; and
wherein the first turning portions of the other first air curtains arranged at both sides of the central first air curtain disposed at the center are formed such that widths gradually increase in an opposite direction to the central first air curtain as they go to fronts.

9. The speed-sensitized type air duct apparatus of claim 7, wherein a front end of each first turning portion is inclined rearward.

10. The speed-sensitized type air duct apparatus of claim 9, wherein the first turning portion of a central first air curtain is formed such that both sides are inclined rearward at a center, the central first air curtain being disposed at a center of the first air curtains; and
wherein the first turning portions of the other first air curtains are formed to be inclined rearward in the opposite direction to the central first air curtain.

11. The speed-sensitized type air duct apparatus of claim 10, wherein inclination angles of the first turning portion of the first central air curtain disposed at the center and the first turning portions formed at the other first air curtains are formed such that the inclinations of the first turning portions gradually increase as they go away from the central first air curtain.

12. The speed-sensitized type air duct apparatus of claim 1, wherein the second air curtains include:
a plurality of fixed guides extending in the front-rear direction; and
turning guides spaced apart from the fixed guides and extending in the front-rear direction, each turning guide having second turning portions protruding toward the fixed guides at a rear end.

13. The speed-sensitized type air duct apparatus of claim 12, wherein each turning guide has a straight end portion spaced apart from the fixed guides and extending in the front-rear direction, and an extending end portion curved toward the outlet from the straight end portion; and
wherein one or more second turning portions laterally protruding toward the fixed guides are formed at the extending end portion.

14. The speed-sensitized type air duct apparatus of claim 13, wherein first paths for the flow of the cooling air are formed between the fixed guides and between the fixed guides and the air duct, second paths are formed between the straight end portion of the turning guides and the fixed guides, and the second turning portions protrude in the second paths, so the flow of the cooling air flowing through the second paths is turned to the first paths.

15. The speed-sensitized type air duct apparatus of claim 14, wherein widths of the first paths are smaller than widths of the second paths, so the flow rate of the cooling air in the second paths will be larger than the flow rate of the cooling air in the first paths.

16. The speed-sensitized type air duct apparatus of claim 12, wherein the second turning portions each protrude to have a curved surface and a protrusive angle of the curved surface is an acute angle with respect to the flow direction of the cooling air.

17. The speed-sensitized type air duct apparatus of claim 16, wherein rear ends of fixed guides disposed adjacent to the second turning portions of the fixed guides are curved in the same direction as the curved surfaces of the second turning portions.

18. The speed-sensitized type air duct apparatus of claim 1, wherein the inlet of the air duct is larger than the outlet and a cooling unit is disposed behind the outlet.

19. A speed-sensitized type air duct apparatus comprising:
an air duct having an internal space, an inlet at a front through which cooling air can be introduced, and an outlet at a rear through which the cooling air can be discharged; and
a guide extending across the internal space of the air duct in a front-rear direction, the guide having a plurality of first air curtains and a plurality of second air curtains configured to guide a flow of the cooling air and having turning portions to change a flow direction of the cooling air at some sections to decrease a flow rate of the cooling air that is discharged to the outlet with the flow direction of the cooling air further changed as a flow speed of the cooling air entering the inlet increases, the plurality of first air curtains having first turning portions at front ends to change the flow direction of the cooling air entering the inlet, and the plurality of second air curtains having second turning portions at rear ends to change the flow direction of the cooling air that has flowed in the internal space, wherein
the first air curtains are disposed in a central area of the air duct and the second air curtains are disposed at opposite sides of the first air curtains, and
a central first air curtain that is disposed at a center of the first air curtains is longer than all other first air curtains, the other first air curtains being arranged at sides of the central first air curtain.

20. A speed-sensitized type air duct apparatus comprising:
an air duct having an internal space, an inlet at a front through which cooling air can be introduced, and an outlet at a rear through which the cooling air can be discharged; and
a guide extending across the internal space of the air duct in a front-rear direction, the guide having a plurality of first air curtains and a plurality of second air curtains configured to guide a flow of the cooling air and having turning portions to change a flow direction of the cooling air at some sections to decrease a flow rate of the cooling air that is discharged to the outlet with the flow direction of the cooling air further changed as a flow speed of the cooling air entering the inlet increases, the plurality of first air curtains having first turning portions at front ends to change the flow direction of the cooling air entering the inlet, and the plurality of second air curtains having second turning portions at rear ends to change the flow direction of the cooling air that has flowed in the internal space, wherein
the first air curtains are disposed in a central area of the air duct and the second air curtains are disposed at opposite sides of the first air curtains, and
the second air curtains include:
a plurality of fixed guides extending in the front-rear direction, and
turning guides spaced apart from the fixed guides and extending in the front-rear direction, each turning guide having second turning portions protruding toward the fixed guides at a rear end.

* * * * *